United States Patent
Santhoff et al.

(10) Patent No.: US 7,042,417 B2
(45) Date of Patent: May 9, 2006

(54) ULTRA-WIDEBAND ANTENNA ARRAY

(75) Inventors: John H. Santhoff, San Diego, CA (US); Henning F. Harmuth, Destin, FL (US)

(73) Assignee: Pulse-LINK, Inc., Carlsbad, CA (US)

(*) Notice: Subject to any disclaimer, the term of this patent is extended or adjusted under 35 U.S.C. 154(b) by 0 days.

(21) Appl. No.: 10/291,112

(22) Filed: Nov. 8, 2002

(65) Prior Publication Data

US 2003/0090435 A1    May 15, 2003

Related U.S. Application Data

(60) Provisional application No. 60/338,162, filed on Nov. 9, 2001.

(51) Int. Cl.
*H01Q 21/00* (2006.01)

(52) U.S. Cl. ............................ 343/893; 342/28

(58) Field of Classification Search ............... 343/757, 343/760, 893, 894; 342/28
See application file for complete search history.

(56) References Cited

U.S. PATENT DOCUMENTS

| | | |
|---|---|---|
| 4,641,317 A | 2/1987 | Fullerton |
| 4,743,906 A | 5/1988 | Fullerton |
| 4,799,062 A | 1/1989 | Sanderford, Jr. et al. |
| 4,813,057 A | 3/1989 | Fullerton |
| 4,979,186 A | 12/1990 | Fullerton |
| 5,146,616 A | 9/1992 | Tang et al. |
| 5,223,838 A | 6/1993 | Tang et al. |
| 5,363,108 A | 11/1994 | Fullerton |
| 5,389,939 A | 2/1995 | Tang et al. |
| 5,455,593 A * | 10/1995 | Ross ........................ 342/375 |
| 5,519,400 A | 5/1996 | McEwan |
| 5,960,355 A | 9/1999 | Ekman et al. |
| 6,091,374 A * | 7/2000 | Barnes ...................... 343/787 |
| 6,133,876 A | 10/2000 | Fullerton et al. |
| 6,177,903 B1 * | 1/2001 | Fullerton et al. ............. 342/28 |
| 6,218,979 B1 * | 4/2001 | Barnes et al. ................. 342/28 |
| 6,300,903 B1 * | 10/2001 | Richards et al. ............ 342/450 |
| 6,300,914 B1 * | 10/2001 | Yang .......................... 343/741 |
| 6,529,166 B1 * | 3/2003 | Kanamaluru ......... 343/700 MS |
| 6,667,724 B1 * | 12/2003 | Barnes et al. ............... 343/893 |
| 2002/0109632 A1 | 8/2002 | Fullerton et al. |
| 2002/0140616 A1 | 10/2002 | Kanamaluru |

OTHER PUBLICATIONS

Garg, Vijay K. et al., "Wireless and Personal Communications Systems," 1996, pp. 86-96, Chapter 5, Prentice Hall PTR, Upper Saddle River, New Jersey, United States of America.

* cited by examiner

*Primary Examiner*—Shih-Chao Chen
(74) *Attorney, Agent, or Firm*—Pulse-LINK, Inc.; Peter R. Martinez; Steven A. Moore

(57) ABSTRACT

An ultra-wideband (UWB) antenna array is provided. One embodiment of the present invention employs a multi-element antenna for UWB beam forming and also for time-of-arrival vector processing to resolve multi-path problems in an UWB communication system. Another embodiment of the present invention recovers the energy contained in the multi-path reflections to increase signal-to-noise ratios of received UWB pulses.

6 Claims, 5 Drawing Sheets

PRIOR ART

ULTRA-WIDEBAND ANTENNA ARRAY

Priority is claimed to U.S. Provisional Application Ser. No. 60/338,162, filed Nov. 9, 2001, titled "Method and Apparatus for Transmitting and Receiving Ultra-Wideband Signals," which is referred to and incorporated herein in its entirety by this reference.

FIELD OF THE INVENTION

The present invention generally relates to ultra-wideband (UWB) communication systems. More particularly, the invention concerns a multi-element antenna array for receiving and transmitting UWB signals.

BACKGROUND OF THE INVENTION

In the theory, an ultra-wideband (UWB) pulse, or signal, transmitted from a source and received by a target arrives without any delays or distortions caused by the surrounding environment. Such an ideal environment is difficult to realize outside the vacuum of outer space. In more practical environments and especially in urban settings, the environment may have a substantial impact on the received UWB signal.

For example, natural and man-made features, such as buildings, roads, ground and other features may provide different paths for portions of a UWB signal to travel. Indeed, via such multiple paths, or multipaths, portions of the UWB signal can arrive at a receiver at different times. In this situation, the UWB signal strength is diminished due to the multiple reflections, and the delayed portions of the UWB signal may add to the surrounding electromagnetic noise and degrade the signal-to-noise ratio.

Therefore, there exists a need for an apparatus, method and a system for transmitting and receiving UWB signals that diminishes, if not eliminates, the above-described problems, among others.

SUMMARY OF THE INVENTION

In order to increase the signal-to-noise ratio, and overcome multipath interference, an ultra-wideband (UWB) antenna array is provided. Briefly, one embodiment of the present invention employs a multi-element antenna for UWB beam forming and also for time-of-arrival vector processing to resolve multi-path problems in an UWB communication system. Another embodiment of the present invention recovers the energy contained in the multi-path reflections to increase signal-to-noise ratios of received UWB pulses.

More specifically, one embodiment of the UWB antenna array employs at least two UWB signal receiving elements structured to receive a plurality of UWB signals. The UWB signals are then synchronized by summing their energy. In this fashion, the signal-to-noise ratio of the received UWB signals is increased.

Another embodiment of the UWB antenna array employs at least two antenna elements that obtain a location of a target and transmit an UWB signal toward the target direction, where the target direction is a horizontal angle between the antenna and the target, as measured from a reference.

These and other features and advantages of the present invention will be appreciated from review of the following detailed description of the invention, along with the accompanying figures in which like reference numerals refer to like parts throughout.

Figure 1:
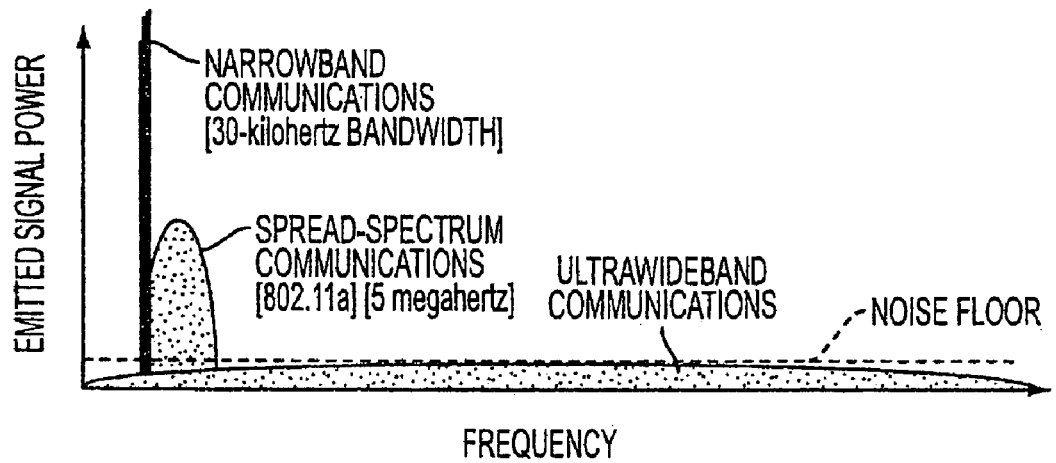
FIG. 1 is an illustration of different communication methods.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention relates to the field of ultra-wideband (UWB) communication systems. A preferred embodiment of the present invention employs multiple antenna elements, or multi-element antenna arrays to emit and shape UWB pulses, or wave fronts to maximize available bandwidth in an UWB communication system, while minimizing radiated radio frequency (RF) energy. One embodiment of the multi-element arrays constructed according to the present invention can also determine a time-of-arrival (TOA) of received UWB pulses, or wave fronts and resolve problems associated with multi-path reflections. Specifically, in one embodiment, the energy contained in the multi-path reflections can be recovered and used to increase signal-to-noise ratios (SNRs) of received UWB pulses. On feature of the present invention is that increased SNRs lower the effective bit-error-rate (BER) and allow for more reliable UWB communications.

The present invention employs ultra-wideband, or impulse radio, that uses pulses of electromagnetic energy that are emitted at nanosecond or picosecond intervals (generally tens of picoseconds to a few nanoseconds in duration). For this reason, ultra-wideband is often called "impulse radio." Because the excitation pulse is not a modulated waveform, UWB has also been termed "carrier-free" in that no apparent carrier frequency is evident in the radio frequency (RF) spectrum. That is, the UWB pulses are transmitted without modulation onto a sine wave carrier frequency, in contrast with conventional radio frequency technology. Ultra-wideband generally requires neither an assigned frequency nor a power amplifier, and because UWB employs a "carrier free" architecture, it does not require the use of high frequency carrier generation hardware, carrier modulation hardware, stabilizers, frequency and phase discrimination hardware or other devices employed in conventional frequency domain communication systems.

Conventional radio frequency technology employs continuous sine waves that are transmitted with data embedded in the modulation of the sine waves' amplitude or frequency. For example, a conventional cellular phone must operate at a particular frequency band of a particular width in the total frequency spectrum. Specifically, in the United States, the Federal Communications Commission has allocated cellular phone communications in the 800 to 900 MHz band. Cellular phone operators use 25 MHz of the allocated band to transmit cellular phone signals, and another 25 MHz of the allocated band to receive cellular phone signals.

Another example of a conventional radio frequency technology is illustrated in FIG. 1. 802.11a, a wireless local area network (LAN) protocol, transmits radio frequency signals at a 5 GHz center frequency, with a radio frequency spread of about 5 MHz.

Figure 2:
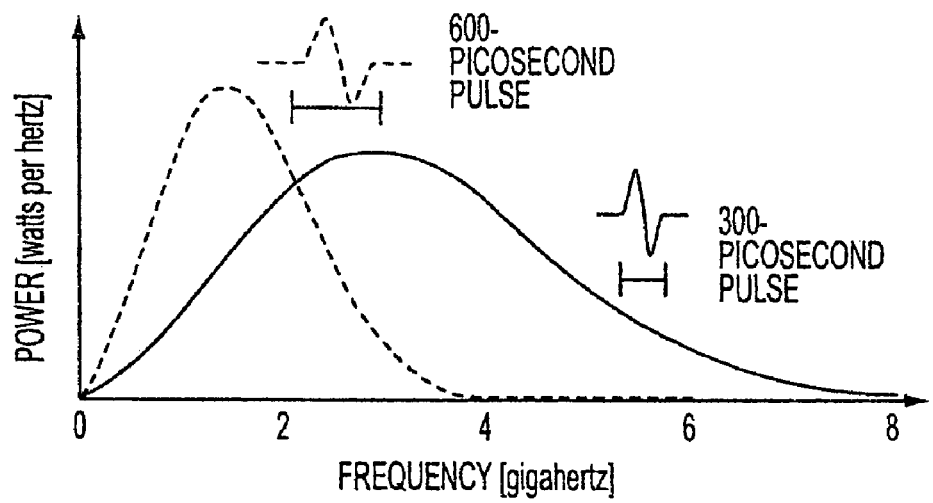
FIG. 2 is an illustration of two ultra-wideband pulses.

In contrast, a UWB pulse may have a 1.8 GHz center frequency, with a frequency spread of approximately 4 GHz, as shown in FIG. 2, which illustrates two typical UWB pulses. FIG. 2 illustrates that the narrower the UWB pulse in time, the higher its center frequency and the broader the spread of its frequency spectrum. This is because frequency is inversely proportional to the time duration of the pulse. A 600 picosecond UWB pulse will have about a 1.8 GHz center frequency, with a frequency spread of approximately 4 GHz. And a 300 picosecond UWB pulse will have about a 3 GHz center frequency, with a frequency spread of approximately 8 GHz. Thus, UWB pulses generally do not operate within a specific frequency, as shown in FIG. 1. And because UWB pulses are spread across an extremely wide frequency range, UWB communication systems allow communications at very high data rates, such as 100 megabits per second or greater.

Further details of UWB technology are disclosed in U.S. Pat. No. 3,728,632 (in the name of Gerald F. Ross, and titled: Transmission and Reception System for Generating and Receiving Base-Band Duration Pulse Signals without Distortion for Short Base-Band Pulse Communication System), which is referred to and incorporated herein in its entirety by this reference.

Also, because the UWB pulse is spread across an extremely wide frequency range, the power sampled at a single, or specific frequency is very low. For example, an UWB one-watt signal of one nano-second duration spreads the one-watt over the entire frequency occupied by the pulse. At any single frequency, such as at the carrier frequency of a cellular phone provider, the UWB pulse power present is one nano-watt (for a frequency band of 1 GHz). This is well within the noise floor of any cellular system and therefore does not interfere with the demodulation and recovery of the original cellular signals. Generally, the multiplicity of UWB pulses are transmitted at relatively low power (when sampled at a single, or specific frequency), for example, at less than −30 power decibels to −60 power decibels, which minimizes interference with conventional radio frequencies. Alternatively, the multiplicity of UWB pulses of the present invention may be transmitted in a range between about −40 dBm/Hz to about −140 dBm/Hz.

A preferred embodiment of the present invention comprises multi-element antenna elements, or arrays for UWB signal, or beam forming and also for time-of-arrival vector processing to resolve multi-path problems in an UWB communication system. One feature of the present invention is that reception of UWB pulses, or wave fronts by an antenna array constructed according to the present invention allows for the determination of time-of-arrival (TOA) information from which an azimuth, or vector of the received UWB pulses, or wave front can be derived. This information can then be used to reliably separate the primary front from the subsequent multi-path reflections.

One feature of the present invention is that the available bandwidth in a UWB communication system can be increased by minimizing the free space radiation of the UWB RF energy by directing a UWB signal along an intended vector, or azimuth. This embodiment of the present invention comprises a vector manipulation process that allows for a scalable UWB communication system that can accommodate a different number of users, data rates and distances while minimizing the effects of multi-path while also lowering the effective radiated power. The methods of the present invention are equally applicable for Point-To-Point, Point-To-Multi-Point, Fixed or mobile users. One feature of the present invention is that the ability to steer, or direct an UWB pulse, or wave front in the direction of the intended receiver, or target increases effective bandwidth in a UWB communication system by maximizing spatial diversity.

There are several differences between UWB wave fronts or pulses, and conventional, sinusoidal transmitted technology. In sinusoidal technology, a directional radiation is achieved by means of an antenna array whose individual radiators are fed from a power source via phase shifters. For reception, the outputs of the individual sensors of an array are fed via phase shifters to a summing circuit. The radiated wave has the same frequency as the driving current fed to the individual radiators. Only amplitude and phase can be different. This is due to the mathematical summation theorem of sinusoidal functions:

$$A_1 \sin(\omega t + \beta_1) + A_2 \sin(\omega t + \beta_2) = A \sin(\omega t + \beta).$$

Conventional methods of antenna array beam forming are based on narrowband sinusoidal waves resulting in a directivity pattern, or array factor, of the form $\sin(x)/x$ with distinguishable side-lobes, and the classical resolution angle as a function of array length and frequency. Individual sinusoidal waves received by an array of sensors produce a sum current or voltage that has the same frequency as the received wave and differs in amplitude and phase only.

These relationships do not apply to non-sinusoidal waves, such as ultra-wideband (UWB) pulses. When processing UWB pulses there are no frequency components or phase relationships to process. All signal processing and manipulations are accomplished in the "time-domain" instead of the "frequency-domain." In the "time-domain," vector processing is accomplished using only the timing and amplitude of the UWB pulses for both transmit and receive.

Figure 3:
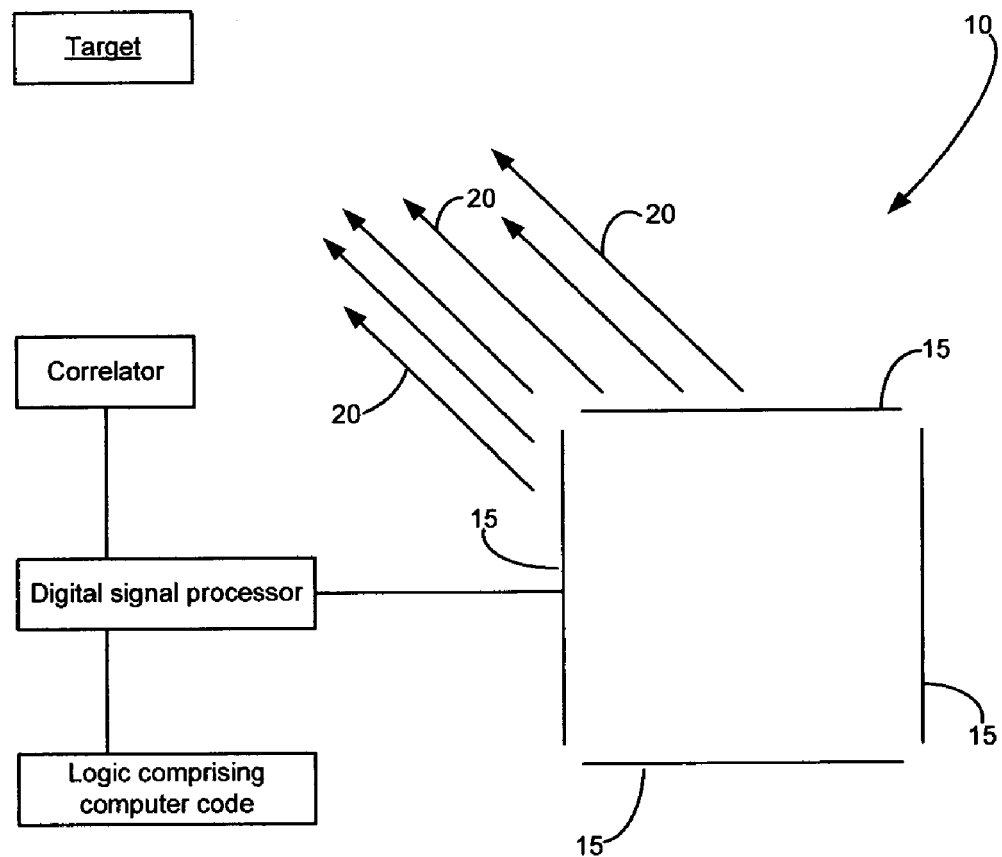
FIG. 3 is an illustration of a multi-element antenna according to an embodiment of the present invention.
Figure 4:
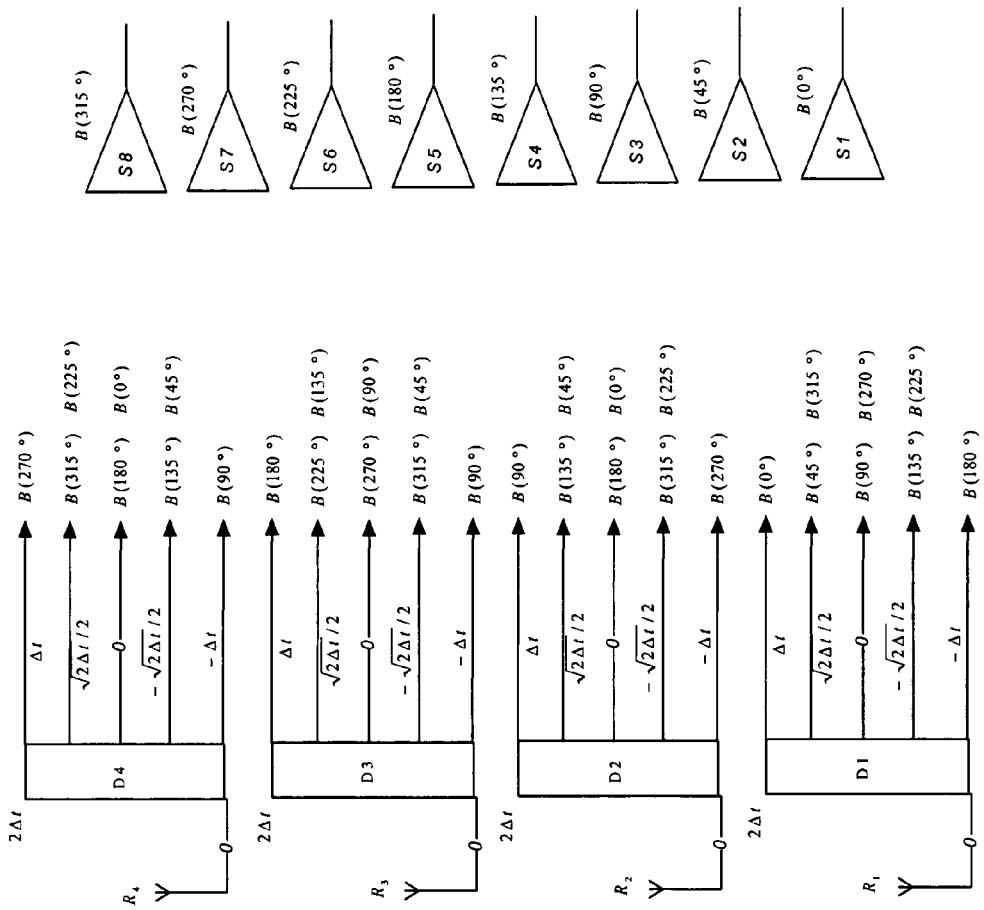
FIG. 4 is a circuit representation of a multi-element antenna constructed according to an embodiment of the present invention.

Referring to FIG. 3, one embodiment of UWB antenna array 10 is illustrated. The UWB can consist of "N" antenna elements 15, where the preferred embodiment described herein consists of four elements. Other UWB antenna arrays 10 are envisioned, with other numbers of antenna elements 15, such as 3, 5 and 6 antenna elements. The UWB antenna array 10 has discrete radiation and reception circuits, shown in FIG. 4. The reception circuit in FIG. 4 receives data from four receptors on the antenna element 15. Using vector processing, eight separate UWB beams 20 can be produced: B(0°) to B(315°), from the four radiators R1 to R4. These UWB beams 20 can be steered, or directed by the UWB antenna array 10 in any desired direction.

The outputs of the four delay circuits are connected to eight summing circuits $S_1$ to $S_8$, or B(0°) to B(315°). In one embodiment, the outputs of the four sensors R1 to R4 may be fed to the delay circuits D1 to D4. The four delay circuits in FIG. 4 have a total delay of 2Δt, with intermediate delays $\sqrt{2}\Delta t/2$, Δt, and $-\sqrt{2}\Delta t/2$, between 0 (no delay) and 2Δt (full delay). It will be appreciated that other circuit arrangements may be employed.

Figure 5:
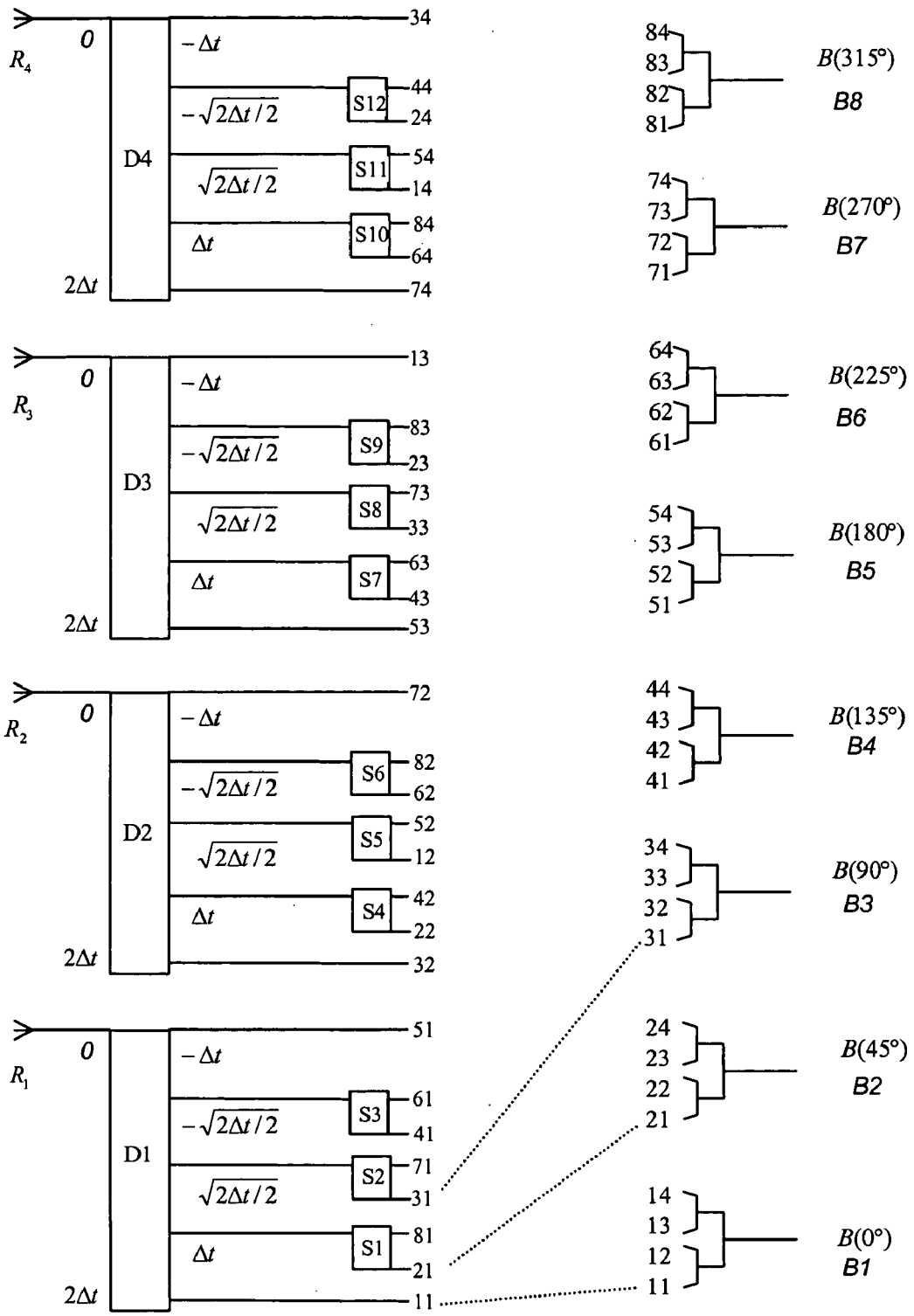
FIG. 5 is a circuit representation of a radiation configuration in a multi-element antenna constructed according to an embodiment of the present invention.

Referring to FIG. 5, a UWB pulse, or beam forming radiation circuit is illustrated. The radiation circuit embodiment in FIG. 5 produces eight separate beams $B_1$ to $B_8$ in the directions 0° to 315° by means of four separate radiators on a UWB antenna element 15. One method of employing a UWB antenna element 15 constructed of the illustrated radiation circuits is to feed an UWB pulse is into any one of the input terminals $B_1$ to $B_8$, and the radiation circuit will produce UWB pulses that are sent to the four radiators with such timing that an UWB pulse, or beam is generated in the desired azimuth, or direction. In this fashion, UWB pulses, or beams can be emitted in a specific direction, instead of omni-directionally. An UWB antenna array 10 constructed in this fashion can maximize the available bandwidth of a UWB communication system while minimizing radiated RF energy.

Figure 6:
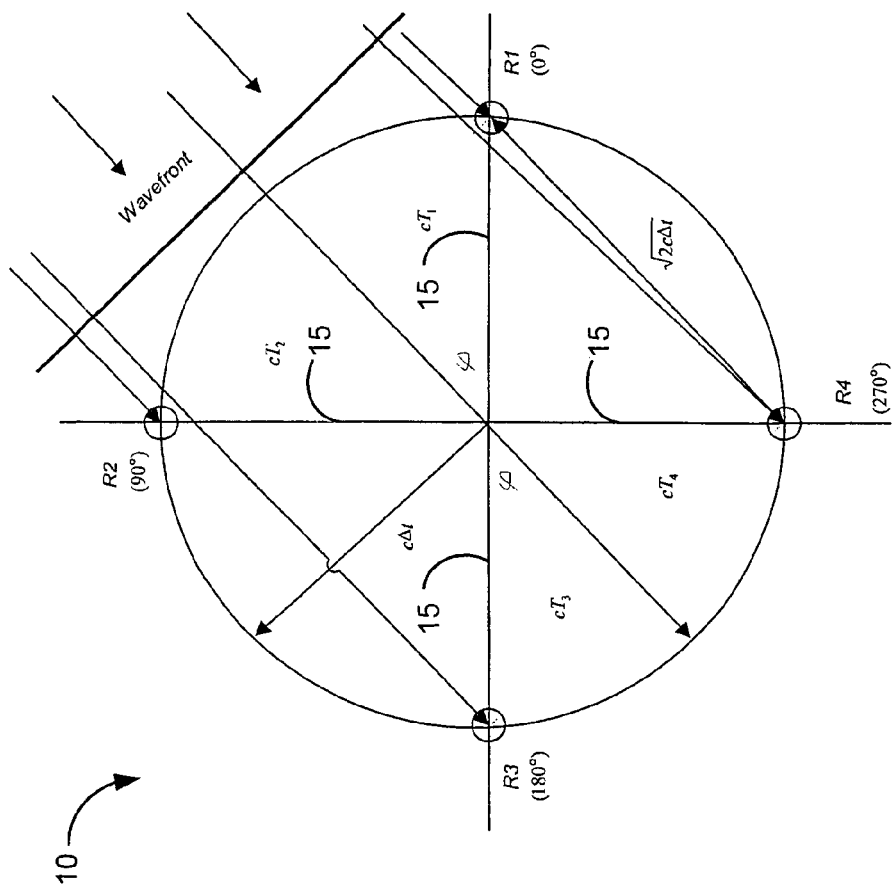
FIG. 6 is a graphical representation of a multi-element radiator-receptor according to an embodiment of the present invention.

Referring to FIG. 6, a four element UWB antenna array 10 configuration is illustrated, with a wave front arriving with the angle of incidence ϕ. Sensors R1, R2, R3 and R4 are individual sensors located on discrete UWB antenna elements 15. When the wave front reaches sensor R1 it still propagates the distance $cT_1$ (where c is the velocity of light and T is time) to reach the center of the UWB antenna element 15. Similarly, the wave front has to propagate the distances $cT_2$, $cT_3$, and $cT_4$ to reach the center of the respective UWB antenna element 15 after reaching sensors $R_2$, $R_3$, and $R_4$. The times $T_3$ and $T_4$ are negative for this illustration, but would be positive for larger values of the angle of incidence ϕ, while $T_1$ and $T_2$ would become negative.

TABLE 1

| α | $T_1/\Delta T$ | $T_2/\Delta T$ | $T_3/\Delta T$ | $T_4/\Delta T$ |
|---|---|---|---|---|
| 0 | 1 | 0 | −1 | 0 |
| 45 | ½√2 | ½√2 | −½√2 | −½√2 |
| 90 | 0 | 1 | −1 | 0 |
| 135 | −½√2 | ½√2 | ½√2 | −½√2 |
| 180 | −1 | 0 | 1 | 0 |
| 225 | −½√2 | −½√2 | ½√2 | ½√2 |
| 270 | 0 | −1 | 0 | 1 |
| 315 | ½√2 | −½√2 | −½√2 | ½√2 |

Table 1 lists the normalized times $T_1\Delta t$ to $T_4\Delta t$ for various angles of incidence ϕ=α, where Δt is defined by the radius cΔt of the circle in FIG. 6. The angle α is introduced as the UWB beam angle defining the direction in which a UWB beam is formed. The angle of incidence ϕ can have any value from 0° to 360°. For ϕ=α an enhancement of the received UWB wave or signal is seen. The normalized delay times that may produce eight beams can be seen in Table 1, and can be formed one, several, or all at one time. The relationship between the eight values of an angle ϕ=α for reception or radiation (as illustrated in FIG. 6), and the times $T_1=\Delta t \cos\phi$, $T_2=\Delta t \cos(\pi/2\ \phi)$, $T_3=-\Delta t \cos\phi$, and $T_4=-\Delta \cos(\pi/2-\phi)$.

One embodiment of the present invention provides methods of reducing extemporaneous signal propagation, and methods of creating focused UWB beams. One embodiment of the present invention comprises computer logic, or software that includes signal-processing techniques to provide a method of achieving optimum user capacity and maximization of user bandwidth in an UWB communication system. This process allows UWB units to dynamically link with other UWB units within the coverage area and provide a selective focused beam as shown in FIG. 3, resulting in an increase in user bandwidth, while also providing geopositional angular, or vector resolution. One feature of the present invention is that it will significantly improve UWB communication system performance for a range of potential UWB users by enabling users to see significant increases in signal quality, capacity, and coverage.

Another embodiment of the present invention employs azimuth data to resolve multi-path reflections. Once the azimuth of the primary UWB wave front is determined, as discussed above with reference to FIG. 6, the incoming multi-path reflections can be resolved. In one embodiment of the present invention, the energy of the multi-path reflections is summed, or collected to increase the signal-to-noise ratio of the received UWB pulse, or signal.

UWB transmissions are typically based on a channelization algorithm that pseudo-randomly spreads the pulses contained in the user channel over time. Generally, how the pulses are spread is less significant than having both transmitter and receiver in sync and using the same spreading algorithm. In one embodiment of the present invention, a unique pulse sequence referred to as a "key pulse synchronization sequence" is used to synchronize transmitter and receiver. Once synchronization is achieved, a pre-designated UWB user channel code sequence to initiate the transfer of data. Multiple UWB user channel sequences can be initiated simultaneously.

The pre-designated channel code sequences are matched against received incoming UWB pulses. The first pulse train sequence matched is considered the primary UWB wave front, because it has traveled the most direct route to the UWB antenna array 10. All subsequent receptions that match the user channel code sequence are processed as multi-path reflections of the primary wave front. These multi-path reflections may be summed to reduce the signal-to-noise ratio of the received UWB pulse.

In a preferred embodiment of the present invention, a real time database is constructed that identifies the azimuth of the primary wave front and all received multi-path reflections. This database is used to track and match each of the individual wave fronts to a corresponding azimuth. By being able to separate and track each multi-path wave front by azimuth it greatly reduces problems associated with multi-path processing in several ways.

For example, the computational load of resolving individual multi-path wave reflections allows for the energy and data contained in these reflections to be used in resolving potential data errors in the primary wave front. Recovered multi-path pulse trains can be superimposed onto the primary wave front, increasing the effective signal-to-noise ratio (SNR) on a pulse-to-pulse basis. A higher SNR may translate to a lower effective bit-error-rate. The methodology used to synchronize the pulse sequences from each individual wave front can be accomplished through the use of correlators and or digital signal processors (DSP).

For yet another example, when using an UWB antenna array 10 constructed according to the present invention to radiate UWB directional wave fronts, radiated energy is minimized and effective bandwidth is increased. That is because the radiated energy is focused towards the intended receiver and not radiated omni-directionally. Bandwidth increase is realized because the number of windows available for UWB user channels is a finite quantity. When radiating omni-directionally this finite resource of windows is wasted by radiating in azimuths where no potential receivers exist. This is not only wasteful of energy and bandwidth, but also affects signal security as well.

Thus, it is seen that that an antenna system and method for UWB communications is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. Many designs other than the above-described embodiments will fall within the literal and/or legal scope of the following claims, and the present invention is limited only by the claims that follow. It is noted that various equivalents for the particular embodiments discussed in this description may practice the invention as well.

What is claimed is:

1. An ultra-wideband antenna array, comprising:
   a first antenna element;
   a second antenna element positioned at an angle relative to the first antenna element;
   a third antenna element positioned at an angle relative to the second antenna element;
   a fourth antenna element positioned at an angle relative to the third antenna element; and
   a correlator communicating with at least one of the antenna elements, the correlator structured to determine a direction of a received ultra-wideband signal.

2. The ultra-wideband antenna array of claim 1, wherein the antenna array determines a time of arrival of a received ultra-wideband signal.

3. The ultra-wideband antenna array of claim 2, wherein the ultra-wideband signal comprises an impulse radio pulse.

4. The ultra-wideband antenna array of claim 1, further including a digital signal processor structured to determine a direction of a received ultra-wideband signal.

5. The ultra-wideband antenna array of claim 1, wherein the ultra-wideband signal comprises a burst of electromagnetic energy having a duration that can range between about 0.1 nanoseconds to about 100 nanoseconds.

6. The ultra-wideband antenna array of claim 1, wherein the ultra-wideband signal comprises a burst of electromagnetic energy having a duration that can range between about 0.1 nanoseconds to about 100 nanoseconds and a power that can range between about +30 power decibels to about −90 power decibels, as measured at a single frequency.

* * * * *